United States Patent [19]

Shuto et al.

[11] Patent Number: 5,182,540
[45] Date of Patent: Jan. 26, 1993

[54] ELECTRICAL RESISTOR ELEMENT AND METHOD OF MANUFACTURING THE SAME

[75] Inventors: Naoki Shuto; Fumio Ueno, both of Yokohama; Yoshiko Goto, Tokyo; Akihiro Horiguchi; Mitsuo Kasori, both of Kawasaki; Motomasa Imai, Tokyo, all of Japan

[73] Assignee: Kabushiki Kaisha Toshiba, Kawasaki, Japan

[21] Appl. No.: 662,628

[22] Filed: Feb. 28, 1991

[30] Foreign Application Priority Data

Feb. 28, 1990 [JP] Japan .................................. 2-47501
Dec. 27, 1990 [JP] Japan .................................. 2-407972

[51] Int. Cl.$^5$ ........................... H01C 8/00; H01C 7/10
[52] U.S. Cl. ..................................... 338/223; 338/20; 338/21
[58] Field of Search ................... 338/20, 21, 34, 35, 338/223, 224, 225; 428/329; 252/506, 517, 518; 264/12

[56] References Cited

U.S. PATENT DOCUMENTS

| | | | |
|---|---|---|---|
| 3,985,842 | 10/1976 | Scott | 264/12 |
| 4,086,556 | 4/1978 | Nitta et al. | 338/35 |
| 4,169,071 | 9/1979 | Eda et al. | 252/517 |
| 4,316,171 | 2/1982 | Miyabayshi et al. | 338/21 |
| 4,378,691 | 4/1983 | Terada et al. | 338/35 X |
| 4,407,778 | 10/1983 | Shiratori et al. | 338/225 |
| 4,531,110 | 7/1985 | Johnson, Jr. et al. | 338/22 R |
| 4,959,262 | 9/1990 | Charles et al. | 428/329 |

FOREIGN PATENT DOCUMENTS

| | | |
|---|---|---|
| 0170975 | 2/1986 | European Pat. Off. . |
| 0270119 | 6/1988 | European Pat. Off. . |
| 0322211 | 6/1989 | European Pat. Off. . |
| 810999 | 8/1951 | Fed. Rep. of Germany . |

OTHER PUBLICATIONS

G. H. Jonker, J. Phys. Chem. Solids, vol. 9, pp. 165-175 (1959) "Analysis of the Semiconducting Properties of Cobalt Ferrite".
World Patents Index Latest, 83-40049K, Sep. 10, 1981, & JP-A-58-045160, Mar. 16, 1983.
Patent Abstracts of Japan, vol. 5, No. 179 (E-82) Nov. 17, 1981, & JP-A-56-104411, Aug. 20, 1981.

*Primary Examiner*—Marvin M. Lateef
*Attorney, Agent, or Firm*—Oblon, Spivak, McClelland, Maier & Neustadt

[57] ABSTRACT

A resistor element includes a hollow cylindrical sintered body and a pair of electrodes formed on the upper and lower surfaces of the sintered body. The sintered body contains ferrite as a main constituent and contains 0.05 to 10% by volume of an insulator phase formed at the crystal grain boundary of the ferrite crystals. An insulating layer is formed to cover the side surface of the sintered body. The sintered body contains an oxide material selected from the group consisting of 0.005 to 2.0% by weight of bismuth oxide calculated in terms of $Bi_2O_3$, 0.01 to 3.0% by weight and 0.005 to 2.0% by weight of silicon oxide and aluminum oxide calculated in terms of $SiO_2$ and $Al_2O_3$ respectively, and 0.01 to 3.5% by weight and 0.001 to 1.6% by weight of silicon oxide and calcium oxide calculated in terms of $SiO_2$ and CaO, respectively.

17 Claims, 2 Drawing Sheets

ELECTRICAL RESISTOR ELEMENT AND METHOD OF MANUFACTURING THE SAME

BACKGROUND OF THE INVENTION

1. Field of the Invention

The present invention relates to a resistor element suitable for absorbing the surge accompanying the opening/closing of, for example, a breaker, particularly, to an electrical resistor element suitable for use in a power equipment such as a breaker and a method of manufacturing the same.

2. Description of the Related Art

Various electrical resistor elements are widely used nowadays. For example, such resistor elements are used for the current control in breakers, etc., for various controls accompanying the starting and stopping of motors, and for the grounding in the occurrence of abnormalities in the power transmitting system. The resistor bodies used in these resistor elements include, for example, metallic resistors, ceramic resistors and various composite resistors.

In, for example, a breaker for a high voltage, an closing resistor is connected in parallel with a breaking point in order to absorb the surge accompanying the opening/closing of the breaker and to increase the breaking capacitance. A resistor body of a resistor element used for such an object is disclosed in, for example, Published Unexamined Japanese Patent Application No. 58-139401. In this prior art, used is a ceramic resistor body having carbon particles dispersed therein. To be more specific, the conductive component of carbon powder is dispersed in the insulating component of aluminum oxide crystals, and the resultant body is fired using clay so as to manufacture the resistor body disclosed in this prior art. It is taught that the resistor body has a resistivity of 100 to 2500 $\Omega \cdot cm$.

It is certainly possible to control the resistivity of the resistor body by adjusting the amount of the carbon powder dispersed in the aluminum oxide crystals. However, the resistor body of this type has such a high porosity as 10% to 30%. In other words, the resistor body is low in its density, giving rise to various problems. First of all, the heat capacity per unit volume is as small as 2 J/cc·K, leading to a small resistance to discharge. As a result, a marked temperature elevation is brought about by the heat generation accompanying the surge absorption. What should also be noted is that a discharge takes place among the carbon particles in the stage of absorbing the surge accompanying the opening/closing of the breaker, leading to a discharge throughout the resistor element. In short, the conventional resistor body disclosed in Published Unexamined Japanese Patent Application No. 58-139401 leaves room for further improvement when used as a resistor body in a breaker for a high voltage.

Further, in accordance with miniaturization of the breaker achieved by the marked technical progress in recent years, it is required to miniaturize the input resistor element for absorbing the surge accompanying the opening/closing of the breaker. In order to miniaturize the closing resistor element, it is necessary for the resistor body included in the resistor element to have a large heat capacity per unit volume. It is difficult to further miniaturize the closing resistor element by using the conventional resistor body having a heat capacity of 2 J/cm3·K.

The difficulty noted above can be overcome by using a ceramic resistor such as ferrite which has such a large heat capacity per unit volume as 3.0 to 4.0 J/cm3·K.

In general, ferrite is represented by a chemical formula $Me_xFe_{3-x}O_4$, which is one of spinel type oxides. The metal "Me" included in the formula given above may be Ni, Co, Zn, Cu, etc. In general, one of these metals is contained in the ferrite. However, it is possible for Me to denote a plurality of these metals contained together in the ferrite. Also, the value of "x" in the formula given above is generally 1. However, "x" falls within a range of between 0 and 3 in some kinds of ferrite. In this case, the resistivity of the ferrite can be controlled by suitably selecting the value of "x". For example, FIG. 1 shows that the resistivity of cobalt ferrite ($Co_xFe_{3-x}O_4$) can be changed within a range of between $10^2$ $\Omega \cdot cm$ and $10^8$ $\Omega \cdot cm$ by suitably selecting the value of "x" (See, for example, J. Phys. Chem. Solids 9, 165 (1959)).

However, some components of the ferrite are partly evaporated depending on the sintering temperature and composition, leading to a change in the composition of the ferrite. As a result, it is impossible to obtain a large sintered body, for example, a disk-like sintered body having a diameter of 10 cm or more because of the problems noted below. First of all, the evaporation noted above makes it difficult to obtain a dense sintered body. A second problem is that, in the case of manufacturing a plurality of sintered bodies, the resultant sintered bodies are made nonuniform in resistivity. What should also be noted is that the evaporation takes place nonuniformly within the sintered body, with the result that the sintered body comprises a high resistivity portion and a low resistivity portion. In other words, a resistivity distribution is formed in the sintered body. Under the circumstances, where a resistor element including a resistor body formed of ferrite is used for absorbing the surge accompanying the opening/closing of a breaker heat is generated in the high resistivity portion of the resistor body. As a result, the resistor body tends to be broken by the thermal stress caused by the heat generation.

The oxide semiconductor such as ferrite gives rise an additional difficulty. Specifically, the resistivity is lowered with increase in the temperature. The temperature coefficient of resistivity (TCR), which denotes the change with temperature in resistivity, is defined as follows in view of the conditions under which the input resistor element for the surge absorption is used:

$$TCR = \frac{(\rho_{120} - \rho_{20})/\rho_{20}}{120 - 20} \times 100 \; [\%/deg]$$

where $\rho_{120}$ the resistivity at 120° C. and $\rho_{20}$ represents the resistivity at 20° C. For example, a cobalt ferrite sintered body sintered under the air atmosphere has a temperature coefficient of resistivity of about $-0.70$ to $-0.99\%/deg$. In other words, if the temperature of the resistor body is elevated by 100° C. from 20° C. to 120° C., the resistivity at 120° C. is lowered by 70% to 99% from the resistivity at 20° C. to reach 30% to 1% of the value at 20° C. It follows that, if the temperature of the resistor body is elevated by the surge absorption, the resistivity of the resistor body is lowered so as to bring about a thermal runaway. In this case, it is impossible for the resistor element to absorb completely the surge accompanying the opening/closing of the breaker. In order to prevent the thermal runaway, it is desirable for the resistor body of the closing resistor element to have a temperature coefficient of resistivity of at least −0.30%/deg, preferably at least −0.20%/deg.

To reiterate, ferrite is widely known to the art in respect of the electrical properties such as the resistivity and the thermal properties such as the heat capacity. However, a resistor body effective for the surge absorption has not yet been developed.

SUMMARY OF THE INVENTION

An object of the present invention is to provide an electrical resistor element having a large heat capacity per unit volume, a sufficiently high resistivity, and a large temperature coefficient of resistivity.

According to an aspect of the present invention, there is provided an electrical resistor element comprising a sintered body which contains ferrite ceramics of a spinel structure represented by a chemical formula $Me_xFe_{3-x}O_4$ (where Me is a metal element, and x falls within a range of $0<x<3$), and a pair of electrodes formed on the sintered body, wherein the sintered body contains at least one kind of oxide material selected from the group consisting of (1) 0.05% to 20% by weight of bismuth oxide calculated in terms of $Bi_2O_3$, (2) 0.01% to 3.0% by weight of silicon oxide calculated in terms of $SiO_2$, and 0.005% to 2.0% by weight of aluminum oxide calculated in terms of $Al_2O_3$, and (3) 0.01% to 3.5% by weight of silicon oxide calculated in terms of $SiO_2$ and 0.001% to 1.6% by weight of calcium oxide calculated in terms of CaO.

According to another aspect of the present invention, there is provided an electrical resistor element comprising a sintered body which contains ferrite ceramics of a spinel structure represented by a chemical formula $Me_xFe_{3-x}O_4$ (where Me is an elemental metal, and x falls within a range of between $0<x<3$), and a pair of electrodes formed on the sintered body, wherein the sintered body contains 0.05% to 10% by volume of an insulator phase present in the crystal boundaries of the ferrite ceramics.

According to still another aspect of the present invention, there is provided a method of manufacturing an electrical resistor element comprising a sintered body which contains ferrite ceramics of a spinel structure represented by a chemical formula $Me_xFe_{3-x}O_4$ (where Me is an elemental metal, and x falls within a range of $0<x<3$), and a pair of electrodes formed on the sintered body, comprising the steps of preparing a precursor to the sintered body, and sintering the precursor under an inert atmosphere so as to form 0.05% to 10% by volume of an insulator phase in the crystal boundaries of the sintered body.

The electrical resistor element of the present invention has a large heat capacity per unit volume and is small in the change with temperature of the resistivity. It follows that the present invention is effective for miniaturizing the resistor element included in a power equipment such as a breaker. Further, method of the present invention permits easily manufacturing such an electrical resistor element.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
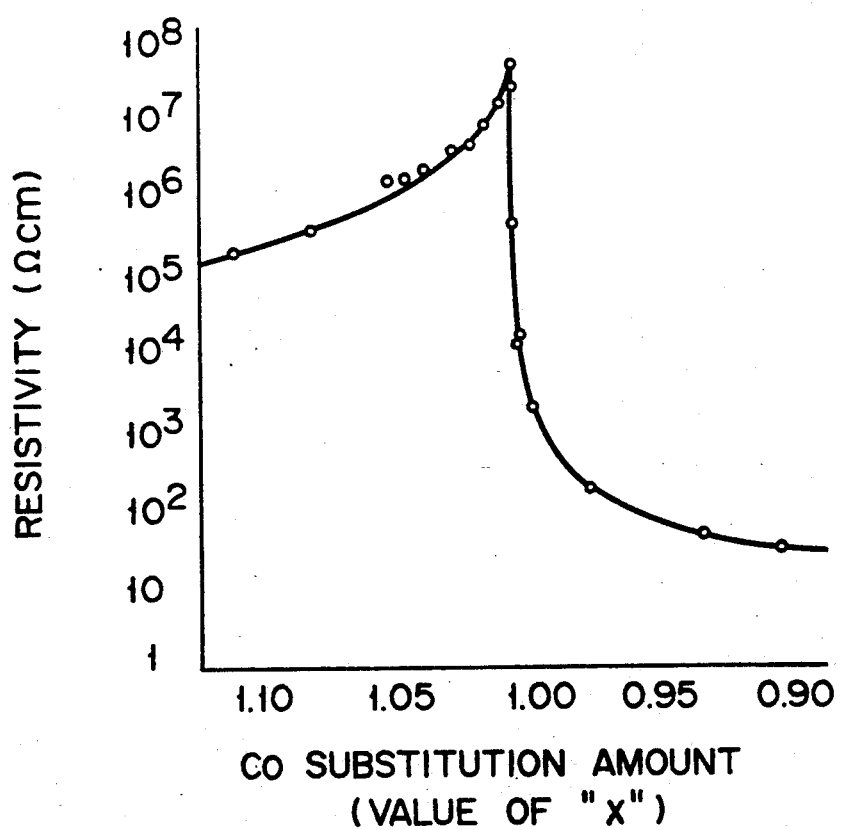
FIG. 1 is a graph of resistivity with respect to a Co substitution amount in ferrite ceramics.

The resistor element of the present invention comprises a sintered body containing ferrite ceramics and a pair of electrodes formed on the sintered body. The ferrite ceramics constituting the main component of the sintered body is one of spinal type oxides represented by a chemical formula $Me_xFe_{3-x}O_4$, wherein "Me" represents a metal such as Ni, Co, Zn or Cu. In the present invention, it is possible for Me to denote a plurality of such metals which are used together. In the ordinary ferrite, the value of "x" in the formula given above is 1. However, it is possible for "x" to be changed within a range of $0<x<3$. The resistivity of the ferrite can be controlled by suitably selecting the value of "x". Incidentally, the ferrite itself has a large heat capacity. Naturally, a resistor element comprising a ferrite ceramics-based sintered body exhibits a large heat capacity per unit volume of the resistor body.

The ferrite ceramic material used in the present invention contains an oxide material selected from the group consisting of (1) a bismuth oxide, (2) a combination of a silicon oxide and a aluminum oxide, and (3) combination of a silicon oxide and a calcium oxide. The oxide material serves to form an insulator phase of a low melting point at the crystal boundary of the ferrite ceramics. In the case of using a bismuth oxide, the bismuth oxide is present in the form of an insulating $Bi_2O_3$ having a low melting point or a eutectic compound at the grain boundary such as a crystal triple point. Where a silicon oxide and an aluminum oxide are used together, an insulating material of a three component system having a low melting point, i.e., $FeO-SiO_2-Al_2O_3$, is formed at the crystal grain boundary. Further, where a silicon oxide and a calcium oxide are used together, an insulating material of a three component system having a low melting point, i.e., $FeO-SiO_2-CaO$, is formed at the crystal grain boundary. The presence of such an oxide material permits improving the properties of the resistor body because of the mechanism described below.

In the sintering temperature (900° to 1300° C.) specified in the present invention, the bismuth oxide ($Bi_2O_3$) which has a melting point of 820° C. is in a molten state. Also, the bismuth oxide and ferrite form liquite phase of eutectic oxide having a melting point of about 700° C. in the sintering step. Therefore, a liquid phase sintering proceeds so as to improve the sintering capability and, thus, to form a dense sintered body. In addition, the sintering can be performed at a temperature lower than that for sintering the ordinary ferrite, making it possible to suppress the element evaporation. It follows that the sintered body is enabled to exhibit a uniform resistivity throughout the entire region.

In the case of using both a silicon oxide and an aluminum oxide, it is possible to form a three component system of $FeO-SiO_2-Al_2O_3$ as pointed out above. It is widely known to the art that a eutectic oxide having a melting point of 1200° C. or lower is formed depending on the mixing ratio of these three components, as described in, for example, "Am.J.Sci. (5th Seres), 24, 177-213 (1932)". Where the molar ratio of $SiO_2$ to $Al_2O_3$ falls within a range of between 93:7 and 70:30 (or between 89:11 and 58:42 in terms of weight ratio), formed is a eutectic oxide of a low melting point, which is present in a molten state at the sintering temperature specified in the present invention. It follows that the use of a silicon oxide and an aluminum oxide in combination produces effects similar to those obtained by the use of a bismuth oxide. To reiterate, it is possible to obtain a dense sintered body. It is also possible to obtain a sintered body having a uniform resistivity throughout the entire region because the element evaporation is suppressed.

In the case of using both a silicon oxide and a calcium oxide, it is possible to form a three component system of $FeO-SiO_2-CaO$ as pointed out above. An eutectic oxide having a melting point of 1200° C. or lower is also formed in this three component system depending on the mixing ratio of the components. Where the moar ratio of $SiO_2$ to CaO falls within a range of between 93:7 and 51:49 (or between 94:6 and 53:47 in terms of weight ratio), formed is a eutectic oxide of a low melting point, which is present in a molten state at the sintering temperature specified in the present invention. It follows that the use of a silicon oxide and a calcium oxide in combination also makes it possible to obtain a dense sintered body. It is also possible to obtain a sintered body having a uniform resistivity throughout the entire region because the element evaporation is suppressed.

Each of these oxide material is present as an insulator at the crystal grain boundary within the sintered body. Thus, an insulator phase containing the eutectic oxide as a main constituent is formed at the crystal grain boundary of the ferrite sintered body in the present invention. The presence of the insulator phase permits controlling the resistivity of the sintered. Naturally, the resistivity is increased by the presence of the insulator phase. What should also be noted is that an electrical conduction takes place through the insulator phase formed at the grain boundary, with the result that an electrical resistance is brought about because of the tunnel effect. In general, the dependence of the tunnel resistance on temperature is low. It follows that the presence of the insulator phase permits increasing the temperature coefficient of the resistivity of the sintered body. In the present invention, it is possible to set the temperature coefficient of resistivity at −0.30%/deg or more by suitably controlling the sintering atmosphere. In short, the presence of the insulator phase makes it possible to diminish the change with temperature in resistivity of the sintered body.

In the present invention, it is desirable for the insulator phase formed at the crystal grain boundary to occupy 0.05% to 10% by volume, i.e., percent by volume defined by $V_B/V_F \times 100$, where $V_B$ denotes the volume of the insulator phase formed in the sintered body, and $V_F$ denotes the volume of the sintered body. If the amount of the insulator phase is less than 0.05% by volume, the presence of the insulator phase is insignificant in terms of the effect of increasing the resistivity of the sintered body. In order to diminish the volume of the resistor body (sintered body) by at least 30%, compared with the conventional resistor body, it is desirable for the amount of the insulator phase to be 10% by volume or more. If the amount of the insulator phase is larger than 10% by volume, however, the resistivity of the sintered body is unduly increased. In addition, since the heat capacity of the insulator phase is smaller than that of the ferrite, the heat capacity of the sintered body is lowered if the amount of the insulator phase is excessively large.

In order to form the insulator phase in an amount falling within the range specified in the present invention, it is necessary for the sintered body to contain bismuth oxide in an amount of 0.005% to 20% by weight, preferably 0.08% to 20% by weight, more preferably 0.16% to 20% by weight calculated in terms of $Bi_2O_3$, in the case of using a silicon oxide and an aluminum oxide, it is necessary for the sintered body to contain a silicon oxide in an amount of 0.01% to 3.0% by weight, preferably 0.02% to 3.0% by weight calculated in terms of $SiO_2$ and an aluminum oxide in an amount of 0.005% to 2.0% by weight, preferably 0.01% to 1.7% by weight calculated in terms of $Al_2O_3$. Further, in the case of using a silicon oxide and a calcium oxide, it is necessary for the sintered body to contain a silicon oxide in an amount of 0.01% to 3.5% by weight, preferably 0.02% to 3.5% by weight calculated in terms of $SiO_2$ and a calcium oxide in an amount of 0.001% to 1.6% by weight, preferably 0.003% to 1.5% by weight calculated in terms of CaO. It is desirable to use as additives $Bi_2O_3$, $SiO_2$ and $Al_2O_3$ for enabling the sintered body to contain a bismuth oxide, a silicon oxide and an aluminum oxide, respectively. In the case of enabling the sintered body to contain a calcium oxide, it is desirable to use calcium carbonate as an additive. However, the forms of the additives can be determined appropriately. In other words, the additives need not be restricted to those exemplified above, and compounds other than oxides can also be used as additives. Incidentally, the amounts of $Bi_2O_3$, $SiO_2$ and $Al_2O_3$ remain substantially unchanged after the sintering treatment. It follows that the amounts of additives substantially correspond to the amounts contained in the sintered body. On the other hand, calcium carbonate is decomposed by the sintering treatment so as to bring about evaporation of $CO_2$ such being the situation, it is necessary to add calcium carbonate in an amount of 0.003% to 2.7% by weight, preferably 0.005% to 2.7% by weight.

In a preferred embodiment of the present invention, the resistor element comprises a pair of electrodes formed on both sides of a sintered body of the ferrite ceramics. It is desirable for the electrode to be formed of aluminum or nickel. The electrode can be formed in direct contact with the sintered body by means of flame spraying or sputtering. Also, it is desirable for the resistor element to comprise an insulating layer formed of an insulating glass of glass ceramic material in order to prevent discharge from the side surface of the sintered body.

In order to prepare the sintered body, a powdery mixture consisting of predetermined mixing ratios o components is shaped first, followed by sintering the shaped body.

It is desirable to carry out the sintering treatment under an inert gas atmosphere such as a nitrogen gas atmosphere. If sintered under an inert gas atmosphere, it is possible to increase the temperature coefficient of resistivity of the sintered body to $-0.4$ to $-0.5\%/\text{deg}$, compared with the sintering under the air atmosphere.

The reason for the improvement in the temperature coefficient of resistivity is considered to be as follows. Specifically, the iron in the ferrite sintered under the air atmosphere is generally trivalent. However, if sintered under the nitrogen gas atmosphere, the sintered body is reduced during the sintering process so as to bring about a partial dissipation of oxygen and, thus, the sintered body maintains an electrical neutrality so as to partly form a divalent iron in the sintered body. As a result, carriers of an n-type conductivity are formed so as to decrease the activation energy and, thus, to diminish the change with temperature coefficient of resistivity. Also, the ferrite is partly decomposed under a reducing atmosphere so as to form a solid solution having a small activation energy which contains FeO, e.g., CoO—FeO system solid solution in the case of a cobalt ferrite, and NiO—FeO system solid solution in the case of a nickel ferrite, with the result that the temperature coefficient of resistivity is increased. In this case, however, the resistivity of the sintered body sintered under a nitrogen gas atmosphere is as low as $10^{-2}$ to $10^{-1}$ $\Omega\cdot\text{cm}$ when it comes to a ferrite ceramic material which does not contain an insulator phase. On the other hand, the resistivity is increased to about $10^2$ to $10^4$ $\Omega\cdot\text{cm}$ which is desirable for the surge absorption, if an insulator phase is formed in the sintered body as in the present invention.

Figure 3:
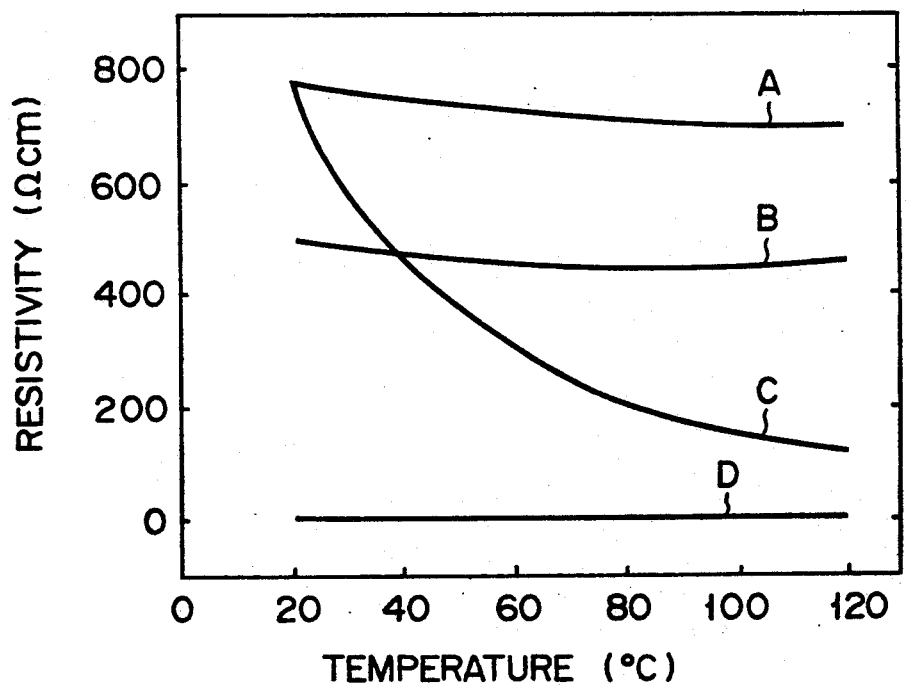
FIG. 3 is a graph of resistivity with respect to temperature, covering a plurality of resistor elements.

To be more specific, FIG. 3 shows the change with temperature in the resistivity of the sintered body. Curve A in FIG. 3 denotes a ferrite ceramic material containing the insulator phase noted above and sintered under a nitrogen gas atmosphere. It is seen that the particular sintered body exhibits a high resistivity and has a high temperature coefficient of resistivity (e.g., the resistivity reduction caused by temperature elevation is low). Curve D denotes a sintered body which does not contain the insulator phase. In this case, the temperature coefficient of resistivity is certainly high, but the resistivity itself of the sintered body is markedly low. Curve B denotes a conventional ceramic resistor body having carbon particles dispersed therein. In this case, the resistivity of the resistor body is lower than that of the sintered body A regardless of temperature. Further, curve C denotes a sintered body prepared by sintering a ferrite ceramic material, which does not contain the insulator phase, under the air atmosphere. In this case, the temperature coefficient of resistivity is low, with the result that the resistivity is markedly lowered under high temperatures. Incidentally, cobalt ferrite was used for preparing the samples of the ferrite ceramic materials constituting the sintered bodies.

In order to increase the density of the sintered body, it is desirable to shape the powdery raw material under a pressure of at least 250 kg/cm². When the shaped body is sintered under an inert gas atmosphere, a helium gas, a neon gas, an argon gas, etc. can also be used as the inert gas in the sintering step, substituting for nitrogen gas. In the case of adding a bismuth oxide to the powdery raw material, it is desirable to carry out the sintering treatment at 900° to 1300° C. In the case of adding both a siliconoxide and an aluminum oxide or both a silicon oxide and a calcium oxide, it is desirable to carry out the sintering treatment at 1050° to 1300° C. If the sintering temperature is low than the lower limit of the temperature range noted above, a liquid phase is unlikely to be formed during the sintering process, resulting in failure to form an insulator phase at the crystal grain boundary of the ferrite ceramic material. If the sintering temperature is higher than 1300° C., however, a ferrite component is partly evaporated during the sintering process. In addition, the grain growth is promoted so as to impair the effect produced by the insulator phase noted above.

Figure 2:
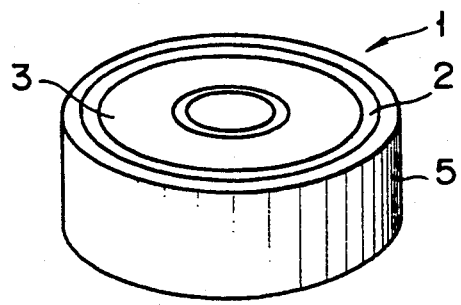
FIG. 2 is an oblique view showing a resistor element according to one embodiment of the present invention.

FIG. 2 shows a resistor element 1 for a breaker according to one embodiment of the present invention. As seen from the drawing, the resistor element 1 comprises a hollow cylindrical sintered body 2 consisting essentially of ferrite and having an insulator phase formed at the grain boundary of the ferrite, and a pair of electrodes 3 formed on the upper and lower surfaces of the sintered body 2. FIG. 2 shows only the electrode 3 formed on the upper surface of the sintered body 2. Further, an insulating layer 5 is formed to surround the side surface of the sintered body 2.

EXAMPLES

Examples of the present invention will now be explained.

EXAMPLE 1

Manufactured was a resistor element composing a hollow cylindrical sintered body, a pair of aluminum electrodes mounted on both sides of the sintered body, and an insulating layer formed of borosilicate glass and surrounding the side surface of the sintered body. The sintered body was formed of a cobalt ferrite containing complex oxides consisting of aluminum oxide, silicon oxide and iron oxide.

The resistor element was prepared as follows. In the first step, CoO having an average particle diameter of 1 micron was mixed with a-$Fe_2O_3$ having an average particle diameter of 0.5 micron such that the Co:Fe ratio was 1:2. The mixture was subjected to a wet ball mill mixing within an ethanol solvent for 4 hours, followed by removing the solvent and sieving the mixture. After the sieving, the resultant powdery mixture was put in an alumina crucible and calcinated for 8 hours at 1100° C. under the air atmosphere so as to obtain a calcinated powder of a cobalt ferrite single phase. The calcinated powder was pulverized within an ethanol solvent for 24 hours by using an alumina pot and alumina balls, followed by removing the solvent. Then, 0.12% by weight of aluminum oxide having an average particle diameter of 0.5 micron and 0.24% by weight of a silicon oxide having an average particle diameter of 0.2 micron were added to the pulverized material, and the resultant mixture was subjected to a wet mixing within an ethanol solvent for 4 hours by using a ball mill. After the wet mixing, the solvent was removed and 3% by weight of a 5% aqueous solution of PVA was added to the mixture, followed by passing the resultant mixture through a sieve so as to prepare granulated particles. The granulated particles were shaped by means of a metal mold under a pressure of 500 kg/cm² so as to prepare a hollow cylindrical shaped body having an outer diameter of 148 mm, an inner diameter of 48 mm and a height of 32 mm. The cylindrical shaped body thus prepared was sintered under a nitrogen gas stream for 12 hours at 1150° C.

The sintered body was found to contain 1.0% by volume of an insulator phase formed at the grain boundary. The elemental analysis of the sintered body indicated that the sintered body contained 0.111% by weight of the silicon component and 0.064% by weight of the aluminum component. In other words, the amounts of the silicon and aluminum components used as the raw materials were maintained in the sintered body.

In the next step, the side surface of the sintered body was coated with a borosilicate glass powder, followed by firing the glass powder so as to form an insulating layer. Then, a grinding treatment was applied to the upper and lower surfaces of the sintered body so as to prepare a cylindrical sintered body having an outer diameter of 127 mm, inner diameter of 41 mm and a height of 25.4 mm. After the grinding treatment, the sintered body was washed, followed by forming an aluminum electrode on each of the upper and lower surfaces of the sintered body by means of flame spraying so as to obtain a desired resistor element.

The resistor element was found to exhibit a relative density of 99.5%, a resistivity at room temperature of $840 \pm 200 \Omega \cdot cm$, a resistance of $19.2 \pm 0.5 \Omega$ a temperature coefficient of resistivity of $-0.16\%/deg$, a heat capacity of $3.38 \pm 0.2$ J/cc.deg, and a surge resistance of 815 J/cm$^3$.

Suppose the resistor element thus prepared is used as an input resistor of a breaker. Where 4030 kJ of energy is supplied to the input resistor by means of out-of phase making, it is necessary for the input resistor to have a volume of 14,990 cm$^3$ in order to suppress the temperature elevation of the input resistor to 80° C., or less. In the case of using the resistor element manufactured in Example 1 for preparing the input resistor, the required volume of 14,990 cm$^3$ note above can be obtained by connecting 52 resistor elements in series. In this case, the entire input resistor is sized at 127 mm in diameter and 1321 mm in height, which is sufficiently small in practice.

COMPARATIVE EXAMPLE 1

A ceramic resistor element having carbon therein, which is used in a conventional breaker, has a resistivity at room temperature of 500 $\Omega \cdot cm$, a resistance of 11.4$\Omega$ and a heat capacity of 2.0 J/cc.deg. In the case of using the ceramic resistor element under the conditions same as those in Example 1, the required volume is 25,400 cm$^3$. It follows that, if the conventional resistor element is of a hollow cylindrical form of the size equal to that in Example 1, it is necessary to connect 88 resistor element in series in order to obtain the required volume of 25,400 cm$^3$. In addition, the input resistor prepared by using the conventional resistor elements is sized at 127 mm in diameter and 2235 mm in height, which is 1.7 times as large in volume as that in Example 1. Naturally, the breaker comprising the input resistor is rendered bulky, compared with the breaker comprising the input resistor prepared by using the resistor element manufactured in Example 1. To be more specific, the volume, installing area and weight of the breaker comprising the conventional input resistor are 1.3 times, 1.1 times and 1.2 times as much, respectively, as those of the breaker comprising the input resistor prepared by using the resistor element manufactured in Example 1.

EXAMPLE 2

A resistor element constructed as shown in FIG. 2 was manufactured as follows. In the first step, NiO having an average particle diameter of 0.3 micron was mixed with a-Fe$_2$O$_3$ having an average particle diameter of 0.5 micron such that the Ni:Fe ratio was 1:2. The mixture was subjected to a wet ball mill mixing within an ethanol solvent for 4 hours, followed by removing the solvent and sieving the mixture. After the sieving, the resultant powdery mixture was put in an alumina crucible and calcinated for 8 hours at 1100° C. under the air atmosphere so as to obtain a calcinated powder of nickel ferrite single phase. The calcinated powder was pulverized within an ethanol solvent for 24 hours by using an alumina pot and alumina balls, followed by removing the solvent. Then, 0.12% by weight of aluminum oxide having an average particle diameter of 0.5 micron and 0.23% by weight of a silicon oxide having an average particle diameter of 0.2 micron were added to the pulverized material, and the resultant mixture was subjected to a wet mixing within an ethanol solvent for 4 hours by using a ball mill. After the wet mixing, the solvent was removed and 3% by weight of a 5% aqueous solution of PVA was added to the mixture, followed by passing the resultant mixture through a sieve so as to prepare granulated particles. The granulated particles were shaped by means of a metal mold under a pressure of 500 kg/cm$^2$ so as to prepare a hollow cylindrical shaped body having an outer diameter of 148 mm, an inner diameter of 48 mm and height of 32 mm. The cylindrical shaped body thus prepared was sintered under a nitrogen gas stream for 12 hours at 1150° C.

The sintered body was found to contain 1.0% by volume of an insulator phase formed at the grain boundary. The elemental analysis of the sintered body indicated that the sintered body contained 0.109% by weight of the silicon component and 0.063% by weight of the aluminum component. In other words, the amounts of the silicon and aluminum components used as the raw materials were maintained in the sintered body.

In the next step, the side surface of the sintered body was coated with a borosilicate glass powder, followed by firing the glass powder so as to form an insulating layer. Then, a grinding treatment was applied to the upper and lower surfaces of the sintered body so as to prepare a cylindrical sintered body having an outer diameter of 127 mm, an inner diameter of 41 mm and a height of 25.4 mm. After the grinding treatment, the sintered body was washed, followed by forming an aluminum electrode on each of the upper and lower surfaces of the sintered body by means of flame spraying so as to obtain a desired resistor element.

The resistor element was found to exhibit a relative density of 99.0%, a resistivity at room temperature $875 \pm \Omega 200 \Omega \cdot cm$, a resistance of $19.6 \pm 0.5 \Omega$ a temperature coefficient of resistivity of $-0.17\%/deg$, a heat capacity of $3.46 \pm 0.2$ J/cc.deg, and a surge resistance of 840 J/cm$^3$.

Suppose the resistor element thus prepared is used as an input resistor of a breaker as in Example 1. Where 4030 kJ of energy is supplied to the input resistor by means of out-of-phase making, it is necessary for the input resistor to have a volume of 14,700 cm$^3$ in order to suppress the temperature elevation of the input resistor to 80° C. or less. In the case of using the resistor element manufactured in Example 2 for preparing the input resistor, the required volume of 14,700 cm$^3$ noted above can be obtained by connecting 51 resistor elements in series. In this case, the entire input resistor is sized at 127 mm in diameter and 1295 mm in height, which is sufficiently small in practice. The input resistor thus prepared is smaller in volume by 42%, compared with that in Comparative Example 1. It follows that, when the input resistor is used in a breaker, the breaker is made smaller than that prepared by using the input resistor in Comparative Example 1 by 25% in volume, 10% in installing area and 15% in weight.

EXAMPLES 3 to 17

Resistor elements as shown in Table 1 were manufactured by the method similar to that in Example 1 or 2, and the properties of the resistor elements were measured so as to obtain the results, which are also shown in Table 1. The sintering treatment was carried out under a nitrogen gas atmosphere, as in Examples 1 and 2. As apparent from Table 1, satisfactory results as in Examples 1 and 2 were obtained in each of Examples 3 to 17.

cium carbonate (or 0.19% by weight in terms of calcium oxide) having an average particle diameter of 0.1 micron and 0.48% by weight of a silicon oxide having an average particle diameter of 0.2 micron were added to the pulverized material, and the resultant mixture was subjected to a wet mixing within an ethanol solvent for 4 hours by using a ball mill. After the wet mixing, the solvent was removed and 3% by weight of a 5% aqueous solution of PVA was added to the mixture, followed by passing the resultant mixture through a serve so as to prepare granulated particles. The granulated particles were shaped by means of a metal mold under a pressure of 500 kg/cm$^2$ so as to prepare a hollow cylindrical molding having an outer diameter of 148 mm, an inner diameter of 48 mm and a height of 32 mm. The cylindrical shaped body thus prepared was sintered under a nitrogen gas stream for 12 hours at 1150° C.

TABLE 1

|  | Ferrite composition | SiO$_2$ addition (wt %) | Al$_2$O$_3$ addition (wt %) | Sintering temp. (°C.) | Sintering time (hrs) | Relative density (°C.) | Insulator phase at grain boundary (vol %) |
|---|---|---|---|---|---|---|---|
| Example 3 | CoFe$_2$O$_4$ | 0.012 | 0.006 | 1150 | 12 | 98.7 | 0.05 |
| 4 | CoFe$_2$O$_4$ | 0.024 | 0.012 | 1150 | 12 | 99.0 | 0.10 |
| 5 | CoFe$_2$O$_4$ | 2.44 | 1.24 | 1150 | 12 | 99.8 | 10 |
| 6 | CoFe$_2$O$_4$ | 0.24 | 0.11 | 1200 | 24 | 99.5 | 1.0 |
| 7 | CoFe$_2$O$_4$ | 0.23 | 0.13 | 1200 | 24 | 99.6 | 1.0 |
| 8 | NiFe$_2$O$_4$ | 0.012 | 0.006 | 1150 | 12 | 98.0 | 0.05 |
| 9 | NiFe$_2$O$_4$ | 0.023 | 0.012 | 1150 | 12 | 98.6 | 0.10 |
| 10 | NiFe$_2$O$_4$ | 2.40 | 1.22 | 1150 | 12 | 99.5 | 10 |
| Example 11 | NiFe$_2$O | 0.24 | 0.11 | 1200 | 24 | 99.5 | 1.0 |
| 12 | NiFe$_2$O$_4$ | 0.23 | 0.13 | 1200 | 24 | 99.6 | 1.0 |
| 13 | CoNiFeO$_4$ | 0.23 | 0.12 | 1250 | 12 | 99.5 | 1.0 |
| 14 | ZnFe$_2$O$_4$ | 0.19 | 0.10 | 1100 | 12 | 98.5 | 0.8 |
| 15 | MnFe$_2$O$_4$ | 0.15 | 0.08 | 1300 | 12 | 98.0 | 0.6 |
| 16 | MgFe$_2$O$_4$ | 0.28 | 0.14 | 1100 | 12 | 98.0 | 1.0 |
| 17 | Cu$_{0.7}$Zn$_{0.3}$Fe$_2$O$_4$ | 0.19 | 0.10 | 1200 | 12 | 98.0 | 0.8 |

|  | Ferrite composition | Resistivity (Ω · cm) | Resistance (Ω) | Temp. coefficient of resistivity (%/deg) | Heat capacity (J/cm$^3$K) | Required volume* (cm$^3$) | Volume ratio to comparative Example 1 (%) |
|---|---|---|---|---|---|---|---|
| Example 3 | CoFe$_2$O$_4$ | 650 | 4.5 | −0.25 | 3.36 | 19890 | 78 |
| 4 | CoFe$_2$O$_4$ | 700 | 15.7 | −0.20 | 3.37 | 18450 | 73 |
| 5 | CoFe$_2$O$_4$ | 1050 | 23.5 | −0.13 | 3.32 | 15280 | 60 |
| 6 | CoFe$_2$O$_4$ | 865 | 19.4 | −0.16 | 3.38 | 14990 | 59 |
| 7 | CoFe$_2$O$_4$ | 860 | 19.2 | −0.16 | 3.38 | 14990 | 59 |
| 8 | NiFe$_2$O$_4$ | 700 | 15.7 | −0.22 | 3.43 | 18450 | 73 |
| 9 | NiFe$_2$O$_4$ | 770 | 17.2 | −0.19 | 3.44 | 17000 | 87 |
| 10 | NiFe$_2$O$_4$ | 1150 | 25.7 | −0.14 | 3.42 | 14990 | 59 |
| Example 11 | NiFe$_2$O$_4$ | 880 | 19.7 | −0.17 | 3.46 | 14700 | 58 |
| 12 | NiFe$_2$O$_4$ | 875 | 19.6 | −0.17 | 3.46 | 14700 | 58 |
| 13 | CoNiFeO$_4$ | 880 | 19.7 | −0.19 | 3.46 | 14700 | 58 |
| 14 | ZnFe$_2$O$_4$ | 780 | 17.5 | −0.20 | 3.11 | 16430 | 65 |
| 15 | MnFe$_2$O$_4$ | 800 | 17.9 | −0.18 | 3.13 | 16430 | 65 |
| 16 | MgFe$_2$O$_4$ | 2000 | 44.8 | −0.18 | 3.10 | 16430 | 65 |
| 17 | Cu$_{0.7}$Zn$_{0.3}$Fe$_2$O$_4$ | 810 | 18.1 | −0.19 | 3.23 | 15850 | 62 |

*Volume of input resistor required for absorbing 4030 KJ of energy

EXAMPLE 18

A resistor element constructed as shown in FIG. 2 was manufactured as follows. In the first step, CoO having an average particle diameter of 1 micron was mixed with a-Fe$_2$O$_3$ having an average particle diameter of 0.5 micron such that the Co:Fe ratio was 1:2. The mixture was subjected to a wet ball mill mixing within an ethanol solution for 4 hours, followed by removing the solvent and sieving the mixture. After the sieving, the resultant powdery mixture was put in an alumina crucible and calcinated for 8 hours at 1100° C. under the air atmosphere so as to obtain a calcinated powder of a cobalt ferrite single phase. The calcinated powder was pulverized within an ethanol solvent for 24 hours by using an alumina pot and alumina balls, followed by removing the solvent. Then, 0.33% by weight of cal- The sintered body was found to contain 2.0% by volume of an insulator phase formed at the grain boundary. The elemental analysis of the sintered body indicated that the sintered body contained 0.223% by weight of the silicon component and 0.133% by weight of the calcium component. In other words, the amounts of the silicon and calcium components used as the raw materials were maintained in the sintered body.

In the next step, the side surface of the sintered body was coated with a borosilicate glass powder, followed by firing the glass powder so as to form an insulating layer. Then, a grinding treatment was applied to the upper and lower surfaces of the sintered body so as to prepare a cylindrical sintered body having an outer diameter of 127 mm, an inner diameter of 41 mm and a height of 25.4 mm. After the grinding treatment, the sintered body was washed, followed by forming an aluminum electrode on each of the upper and lower surfaces of the sintered body by means of flame spraying so as to obtain a desired resistor element.

The resistor element was found to exhibit a relative density of 99.0%, a resistivity at room temperature of $840\pm20\Omega\cdot cm$, a resistance of $18.9\pm0.5\Omega$, a temperature coefficient of resistivity of $-0.18\%/deg$, a heat capacity of $3.34\pm0.2$ J/cc·deg, and a surge resistance of 805 J/cm3.

Suppose the resistor element thus prepared is used as an input resistor of a breaker as in Example 1. Where 4030 kJ of energy is supplied to the input resistor by means of out-of-phase making, it is necessary for the input resistor to have a volume of 15,280 cm$^3$ in order to suppress the temperature elevation of the input resistor to 80° C. or less. In the case of using the resistor element manufactured in Example 18 for preparing the input resistor, the required volume of 15,280 cm$^3$ noted above can be obtained by connecting 53 resistor elements in series. In this case, the entire input resistor is sized at 127 mm in diameter and 1346 mm in height, which is sufficiently small in practice. The input resistor thus prepared is smaller in volume by 40%, compared with that in Comparative Example 1. It follows that, when the input resistor is used in a breaker, the breaker is made smaller than that prepared by using the input resistor in Comparative Example 1 by 25% in volume, 10% in installing area and 15% in weight.

EXAMPLES 19 to 34

Resistor elements as shown in Table 2 were manufactured by the method similar to that in Example 18, and the properties of the resistor elements were measured so as to obtain the results which are also shown in Table 2. The sintering treatment was carried out under a nitrogen gas atmosphere as in Example 18. As apparent from Table 2, satisfactory results as in Example 18 were obtained in each of Examples 19 to 34.

TABLE 2

| | Ferrite composition | SiO$_2$ addition (wt %) | CaCO$_3$ addition (wt %) | Sintering temp. (°C.) | Sintering time (hrs) | Relative density (°C.) | Insulator phase at grain boundary (vol %) |
|---|---|---|---|---|---|---|---|
| Example 19 | CoFe$_2$O$_4$ | 0.012 | 0.008 | 1150 | 12 | 98.3 | 0.05 |
| 20 | CoFe$_2$O$_4$ | 0.13 | 0.08 | 1150 | 12 | 98.6 | 0.5 |
| 21 | CoFe$_2$O$_4$ | 2.43 | 1.69 | 1150 | 12 | 99.3 | 10 |
| 22 | CoFe$_2$O$_4$ | 0.42 | 0.46 | 1200 | 24 | 99.0 | 2.0 |
| 23 | CoFe$_2$O$_4$ | 0.58 | 0.10 | 1200 | 24 | 99.0 | 2.0 |
| 24 | NiFe$_2$O$_4$ | 0.012 | 0.008 | 1150 | 12 | 97.8 | 0.05 |
| 25 | NiFe$_2$O$_4$ | 0.12 | 0.08 | 1150 | 12 | 98.5 | 0.5 |
| 26 | NiFe$_2$O$_4$ | 0.47 | 0.33 | 1150 | 12 | 98.7 | 2.0 |
| Example 27 | NiFe$_2$O$_4$ | 2.39 | 1.66 | 1150 | 12 | 99.0 | 10 |
| 28 | NiFe$_2$O$_4$ | 0.56 | 0.92 | 1200 | 24 | 98.8 | 2.0 |
| 29 | NiFe$_2$O$_4$ | 0.57 | 0.10 | 1200 | 24 | 98.8 | 2.0 |
| 30 | CoNiFeO$_4$ | 0.47 | 0.33 | 1250 | 12 | 99.1 | 2.0 |
| 31 | ZnFe$_2$O$_4$ | 0.40 | 0.28 | 1100 | 12 | 98.2 | 1.7 |
| 32 | MnFe$_2$O$_4$ | 0.30 | 0.21 | 1300 | 12 | 97.8 | 1.2 |
| 33 | MgFe$_2$O$_4$ | 0.55 | 0.39 | 1100 | 12 | 97.7 | 2.0 |
| 34 | Cu$_{0.7}$Zn$_{0.3}$Fe$_2$O$_4$ | 0.37 | 0.26 | 1200 | 12 | 97.6 | 1.6 |

| | Ferrite composition | Resistivity ($\Omega\cdot$cm) | Resistance ($\Omega$) | Temp. coefficient of resistivity (%/deg) | Heat capacity (J/cm$^3$K) | Required volume* (cm$^3$) | Volume ratio to comparative Example 1 (%) |
|---|---|---|---|---|---|---|---|
| Example 19 | CoFe$_2$O$_4$ | 610 | 13.7 | −0.27 | 3.34 | 21330 | 84 |
| 20 | CoFe$_2$O$_4$ | 750 | 16.8 | −0.23 | 3.35 | 17300 | 68 |
| 21 | CoFe$_2$O$_4$ | 1050 | 23.5 | −0.15 | 3.23 | 15850 | 62 |
| 22 | CoFe$_2$O$_4$ | 840 | 18.9 | −0.18 | 3.34 | 15280 | 60 |
| 23 | CoFe$_2$O$_4$ | 860 | 19.2 | −0.18 | 3.34 | 15280 | 60 |
| 24 | NiFe$_2$O$_4$ | 670 | 15.0 | −0.25 | 3.42 | 19350 | 76 |
| 25 | NiFe$_2$O$_4$ | 790 | 17.7 | −0.21 | 3.44 | 16430 | 65 |
| 26 | NiFe$_2$O$_4$ | 860 | 19.2 | −0.19 | 3.42 | 14990 | 59 |
| Example 27 | NiFe$_2$O$_4$ | 1150 | 25.7 | −0.15 | 3.32 | 15280 | 60 |
| 28 | NiFe$_2$O$_4$ | 880 | 19.7 | −0.19 | 3.43 | 14700 | 58 |
| 29 | NiFe$_2$O$_4$ | 875 | 19.6 | −0.19 | 3.43 | 14700 | 58 |
| 30 | CoNiFeO$_4$ | 880 | 19.7 | −0.21 | 3.44 | 14700 | 58 |
| 31 | ZnFe$_2$O$_4$ | 780 | 17.2 | −0.20 | 3.09 | 16430 | 65 |
| 32 | MnFe$_2$O$_4$ | 780 | 17.5 | −0.18 | 3.11 | 16430 | 65 |
| 33 | MgFe$_2$O$_4$ | 1200 | 26.9 | −0.22 | 3.10 | 16430 | 65 |
| 34 | Cu$_{0.7}$Zn$_{0.3}$Fe$_2$O$_4$ | 810 | 18.2 | −0.23 | 3.21 | 15850 | 62 |

*Volume of input resistor required for absorbing 4030 KJ of energy

EXAMPLE 35

A resistor element constructed as shown in FIG. 2 was manufactured as follows. In the first step, CoO having an average particle diameter of 1 micron was mixed with a-Fe$_2$O$_3$ having an average particle diameter of 0.5 micron such that the Co:Fe ratio was 1:2. The mixture was subjected to a wet ball mill mixing within an ethanol solution for 4 hours, followed by removing the solvent and sieving the mixture. After the sieving, the resultant powdery mixture was put in an alumina crucible and calcinated for 8 hours at 1100° C. under the air atmosphere so as to obtain a calcinated powder of a cobalt ferrite single phase. The calcinated powder was pulverized within an ethanol solvent for 24 hours by using an alumina pot and alumina balls, followed by removing the solvent. Then, 7.1% by weight of bismuth oxide (Bi$_2$O$_3$) having an average particle diameter of 2 microns was added to the pulverized material, and the resultant mixture was subjected to a wet mixing within an ethanol solvent for 4 hours by using a ball mill. After the wet mixing, the solvent was removed and 3% by weight of a 5% aqueous solution of PVA was added to the mixture, followed by passing the resultant mixture through a seive so as to prepare granulated particles. The granulated particles were shaped by means of a metal mold under a pressure of 500 kg/cm$^2$ so as to prepare a hollow cylindrical shaped body having a outer diameter of 148 mm, an inner diameter of 48 mm and a height of 32 mm. The cylindrical shaped body thus prepared was sintered under a nitrogen gas stream for 12 hours at 1200° C.

The sintered body was found to contain 4.1% by volume of an insulator phase formed at the grain boundary. The elemental analysis of the sintered body indicated that the sintered body contained 6.2% by weight of the bismuth component. In other words, the amounts of the bismuth component used as the raw materials was maintained in the sintered body.

In the next step, the side surface of the sintered body was coated with a borosilicate glass powder, followed by firing the glass powder so as to form an insulating layer. Then, a grinding treatment was applied to the upper and lower surfaces of the sintered body so as to prepare a cylindrical sintered body having an outer diameter of 127 mm, an inner diameter of 41 mm and a height of 25.4 mm. After the grinding treatment, the sintered body was washed, followed by forming an aluminum electrode on each of the upper and lower surfaces of the sintered body by means of flame spraying so as to obtain a desired resistor element.

The resistor element was found to exhibit a relative density of 99.0%, a resistivity at room temperature of 830±20 Ω·cm, a resistance of 18.5±0.5 Ω, a temperature coefficient of resistivity of −0.20%/deg, a heat capacity of 3.32±0.2 J/cc·deg, and a surge resistance of 805 J/cm$^3$.

Suppose the resistor element thus prepared is used as an input resistor of a breaker as in Example 1. Where 4030 kJ of energy is supplied to the input resistor by means of out-of-phase making, it is necessary for the input resistor to have a volume of 15,280 cm$^3$ in order to suppress the temperature elevation of the input resistor to 80° C. or less. In the case of using the resistor element manufactured in Example 18 for preparing the input resistor, the required volume of 15,280 cm$^3$, noted above can be obtained by connecting 53 resistor elements in series. In this case, the entire input resistor is sized at 127 mm in diameter and 1346 mm in height, which is sufficiently small in practice. The input resistor thus prepared is smaller in volume by 40%, compared with that in Comparative Example 1. It follows that, when the input resistor is used in a breaker, the breaker is made smaller than that prepared by using the input resistor in Comparative Example 1 by 25% in volume, 10% in installing area and 15% in weight.

EXAMPLES 36

Resistor elements as shown in Table 3 were manufactured by the method similar to that in Example 35, and the properties of the resistor elements were measured so as to obtain the results which are also shown in Table 3. The sintering treatment was carried out under a nitrogen gas atmosphere as in Example 35. As apparent from Table 3, satisfactory results as in Example 35 were obtained in each of Examples 19 to 34.

TABLE 3

| | Ferrite composition | Bi$_2$O$_3$ addition (wt %) | Sintering temp (°C.) | Sintering time (hrs) | Relative density (°C.) | Insulator phase at grain boundary (vol %) |
|---|---|---|---|---|---|---|
| Example 36 | NiFe$_2$O$_4$ | 6.7 | 1200 | 12 | 99.6 | 3.9 |
| 37 | CoNiFeO$_4$ | 6.8 | 1250 | 12 | 99.5 | 4.0 |
| 38 | ZnFe$_2$O$_4$ | 5.5 | 1100 | 12 | 98.5 | 3.2 |
| 39 | MnFe$_2$O$_4$ | 3.9 | 1300 | 12 | 98.0 | 2.1 |
| 40 | MgFe$_2$O$_4$ | 8.8 | 1100 | 12 | 97.0 | 4.5 |
| 41 | Ci$_{0.7}$Zn$_{0.3}$Fe$_2$O$_4$ | 5.1 | 1200 | 12 | 98.0 | 3.0 |
| 43 | NiFe$_2$O$_4$ | 8.3 | 1200 | 10 | 99.6 | 5.0 |
| Example 44 | CoNiFeO$_4$ | 5.1 | 1100 | 10 | 99.8 | 3.0 |
| 45 | ZnFe$_2$O$_4$ | 15.9 | 1050 | 10 | 98.5 | 9.8 |
| 46 | Mn$_{1.01}$Fe$_{1.99}$O$_4$ | 8.9 | 1200 | 7 | 99.5 | 5.0 |
| 47 | MgFe$_2$O$_4$ | 6.0 | 1200 | 5 | 99.0 | 3.0 |
| 48 | Li$_{0.5}$Fe$_{2.5}$O$_4$ | 17.8 | 1000 | 24 | 98.5 | 9.9 |
| 49 | Cu$_{0.7}$Zn$_{0.3}$Fe$_2$O$_4$ | 16.1 | 1050 | 24 | 98.5 | 9.8 |

| | Ferrite composition | Resistivity (Ω·cm) | Resistance (Ω) | Temp. coefficient of resistivity (%/deg) | Heat capacity (J/cm$^3$K) | Required volume* (cm$^3$) | Volume ratio to comparative Example 1 (%) |
|---|---|---|---|---|---|---|---|
| Example 36 | NiFe$_2$O$_4$ | 860 | 19.2 | −0.20 | 3.45 | 14700 | 58 |
| 37 | CoNiFeO$_4$ | 880 | 19.6 | −0.22 | 3.45 | 14700 | 58 |
| 38 | ZnFe$_2$O$_4$ | 780 | 17.5 | −0.24 | 3.09 | 16430 | 65 |
| 39 | MnFe$_2$O | 790 | 17.6 | −0.20 | 3.12 | 16430 | 65 |
| 40 | MgFe$_2$O$_4$ | 770 | 17.2 | −0.21 | 3.06 | 16720 | 66 |
| 41 | Cu$_{0.7}$Zn$_{0.3}$Fe$_2$O$_4$ | 810 | 18.2 | −0.23 | 3.20 | 15850 | 62 |
| 43 | NiFe$_2$O$_4$ | 820 | 18.4 | −0.20 | 3.21 | 15700 | 62 |
| Example 44 | CoNiFeO$_4$ | 940 | 20.6 | −0.22 | 3.11 | 16200 | 64 |
| 45 | ZnFe$_2$O$_4$ | 650 | 14.6 | −0.24 | 3.03 | 16800 | 66 |
| 46 | Mn$_{1.01}$Fe$_{1.99}$O$_4$ | 900 | 20.1 | −0.20 | 3.16 | 15700 | 62 |
| 47 | MgFe$_2$O$_4$ | 2000 | 44.7 | −0.21 | 3.17 | 15700 | 62 |
| 48 | Li$_{0.5}$Fe$_{2.5}$O$_4$ | 1010 | 22.6 | −0.24 | 2.94 | 17400 | 69 |
| 49 | Cu$_{0.7}$Zn$_{0.3}$Fe$_2$O$_4$ | 730 | 16.3 | −0.23 | 2.86 | 18000 | 71 |

*Volume of input resistor required for absorbing 4030 KJ of energy

EXAMPLE 42

A resistor element constructed as shown in FIG. 2 was manufactured as follows. In the first step, an aqueous solution containing 1 mol% of iron sulfate (FeSO$_4$.7H$_2$O) was mixed with an aqueous solution containing 1 mol % of cobalt sulfate (CoSO$_4$.7H$_2$O) such that the volume ratio of the solution of iron sulfate to the solution of cobalt sulfate was 2.01:0.99. Then, an aqueous solution containing 1 mol % of NaOH was added to the mixture so as to control the pH value at 10.

The aqueous solution thus prepared was heated to 100° C., followed by adding 150 mol % of NaNO$_3$ relative to the iron sulfate so as to achieve oxidation under a heated condition. A precipitate obtained by decantation was washed and filtered, followed by drying the precipitate at 120° C. so as to obtain a powdery sample. The resultant powdery sample was put in an alumina crucible and calcinated under the air atmosphere at 1000° C. for 10 hours so as to obtain a calcinated powder. Then, 8.5% by weight of bismuth oxide (Bi$_2$O$_3$) particles having an average particle diameter of 2 mm were added to the calcinated powder, followed by subjecting the mixture to a wet mixing in a ball mill by using a butanol solvent so as to obtain a slurry. The resultant slurry was dried and, then, granulated by using a 5% aqueous solution of PVA in an amount of 3% by weight. The granulated particles were shaped by means of a mold under a pressure of 500 kg/cm$^2$ so as to prepare a hollow cylindrical shaped body having an outer diameter of 148 mm, an inner diameter of 48 mm and a height of 32 mm. The cylindrical molding thus prepared was sintered under a nitrogen gas stream for 10 hours at 1200° C.

The sintered body was found to contain 5.0% by volume of an insulator phase formed at the grain boundary. The elemental analysis of the sintered body indicated that the sintered body contained 7.6% by weight of the bismuth component. In other words, the amounts of the bismuth component used as the raw materials was maintained in the sintered body.

In the next step, the side surface of the sintered body was coated with a borosilicate glass powder, followed by firing the glass powder so as to form an insulating layer. Then, a grinding treatment was applied to the upper and lower surfaces of the sintered body so as to prepare a cylindrical sintered body having an outer diameter of 127 mm, an inner diameter of 41 mm and a height of 25.4 mm. After the grinding treatment, the sintered body was washed, followed by forming an aluminum electrode on each of the upper and lower surfaces of the sintered body by means of flame spraying so as to obtain a desired resistor element.

The sintered body included in the resistor element thus obtained was found to have a composition CO$_{0.9}$9Fe$_{2.01}$O$_4$. The resistor element was found to exhibit a relative density of about 99.0%, a resistivity at room temperature of 845±20 Ω·cm$^3$ a resistance of 18.9±0.5 Ω, a temperature coefficient of resistivity of −0.20%/deg, a heat capacity of 3.29±0.2 J/cc·deg, and a surge resistance of 820 J/cm$^3$.

Suppose the resistor element thus prepared is used as an input resistor of a breaker as in Example 1. Where 4030 kJ of energy is supplied to the input resistor by means of out-of-phase making, it is necessary for the input resistor to have a volume of 15,280 cm$^3$ in order to suppress the temperature elevation of the input resistor to 80° C. or less. In the case of using the resistor element manufactured in Example 18 for preparing the input resistor, the required volume of 15,280 cm$^3$ noted above can be obtained by connecting 53 resistor elements in series. In this case, the entire input resistor is sized at 127 mm in diameter and 1346 mm height, which is sufficiently small in practice. The input resistor thus prepared is smaller in volume by 40%, compared with that in Comparative Example 1. It follows that, when the input resistor is used in a breaker the breaker is made smaller than that prepared by using the input resistor in Comparative Example 1 by 25% in volume, 10% in installing area and 15% in weight.

COMPARATIVE EXAMPLE 2

A resistor element was manufactured substantially as in Example 42 by sintering at 1400° C. for 24 hours granulated powder prepared, except that bismuth oxide was not added to the calcinated powder in Comparative Example 2. The sintered body included in the resistor element was found to exhibit a relative density of about 95.0%, a resistivity at room temperature of 1030±430 Ω·cm, a resistance of 25±10 Ω, a heat capacity of 2.01±0.8 J/cc·K, and a surge resistance of 500 J/cm$^3$.

It should be noted that the difference in resistivity between the inner region and the outer region of the sintered body was as much as about 10$^5$ times, i.e., 10$^9$ Ω·cm in the inner region in contrast to only 10 Ω·cm in the outer region.

EXAMPLES 43 to 49

Resistor elements as shown in Table 3 given previously were manufactured by the method similar to that in Example 42, and the properties of the resistor elements were measured so as to obtain the results which are also shown in Table 3. The sintering treatment was carried out under a nitrogen gas atmosphere as in Example 42. As apparent from Table 3, satisfactory results as in Example 35 were obtained in each of Examples 43 to 49.

REFERENCE EXAMPLE

The sintering under a nitrogen gas atmosphere was compared with the sintering under the air atmosphere with respect to ferrite in which an insulator phase was not formed. Table 4 shows the results. Reference Examples 1 and 3 shown in Table 4 cover the sintering under a nitrogen gas atmosphere, with Reference Examples 2 and 4 covering the sintering under the air atmosphere.

TABLE 4

|  | Ferrite composition | Sintering temp. (°C.) | Sintering time (hrs) | Relative density (°C.) | Insulator phase at boundary (vol %) | Resistivity (Ω · cm) |
|---|---|---|---|---|---|---|
| Example 1 | CoFe$_2$O$_4$ | 1400 | 24 | 98.0 | 0 | 0.25 |
| 2 | CoFe$_2$O$_4$ | 1400 | 24 | 96.5 | 0 | 10$^{8.4}$ |
| 3 | NiFe$_2$O$_4$ | 1350 | 24 | 97.5 | 0 | 0.20 |
| 4 | NiFe$_2$O$_4$ | 1350 | 24 | 96.0 | 0 | 10$^{8.5}$ |

|  |  | Temp. coefficient of |  | Heat | Required | Volume ratio to comparative |

TABLE 4-continued

|  | Ferrite composition | Resistance ($\Omega$) | resistivity (%/deg) | capacity (J/cm$^3$ K) | volume* (cm$^3$) | Example 1 (%) |
|---|---|---|---|---|---|---|
| Example 1 | CoFe$_2$O$_4$ | $10^{-2.3}$ | −0.48 | 3.30 | $5 \times 10^7$ | 200000 |
| 2 | CoFe$_2$O$_4$ | $10^{6.7}$ | −1.00 | 3.28 | — | — |
| 3 | CoFe$_2$O$_4$ | $10^{-2.3}$ | −0.50 | 3.30 | $6 \times 10^7$ | 250000 |
| 4 | CoFe$_2$O$_4$ | $10^{6.8}$ | −1.00 | 3.36 | — | — |

*Volume of input resistor required for absorbing 4030 KJ of energy

Table 4 clearly shows that the ferrite sintered under a nitrogen gas atmosphere exhibits a high temperature coefficient of resistivity, but is low in resistivity. On the other hand, the ferrite sintered under the air atmosphere exhibits a high resistivity, but is low in its temperature coefficient of resistivity.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An electrical resistor element, comprising a sintered body containing a ferrite ceramic material of a spinel structure represented by the chemical formula Me$_x$Fe$_{3-x}$O$_4$, where Me denotes a metal element, and x is $0 < x < 3$; and electrode means mounted to said sintered body, said sintered body consisting essentially of the main component of Me$_x$Fe$_{3-x}$O$_4$ and oxide material selected from the group consisting of (1) 0.005T to 2.0% by weight of bismuth oxide calculated in terms of Bi$_2$O$_3$, (2) 0.01% to 3.0% by weight and a combination 0.005% to 2.0% by weight of silicon oxide and aluminum oxide calculated in terms of SiO$_2$ and Al$_2$O$_3$, respectively, and (3) a combination of 0.01% to 3.5% by weight and 0.001% to 1.6% by weight of silicon oxide and calcium oxide calculated in terms of SiO$_2$ and CaO, respectively.

2. The electrical resistor element according to claim 1, wherein said sintered body contains 0.08% to 20% by weight of bismuth oxide calculated in terms of Bi$_2$O$_3$.

3. The electrical resistor element according to claim 2, wherein said sintered body contains 0.16% to 20% by weight of bismuth oxide calculated in terms of Bi$_2$O$_3$.

4. The electrical resistor element according to claim 1, wherein said sintered body contains 0.02% to 3.0% by weight and 0.01% to 1.7% by weight of silicon oxide and aluminum oxide calculated in terms of SiO$_2$ and Al$_2$O$_3$ respectively.

5. The electrical resistor element according to claim 4, wherein said sintered body contains 0.02% to 3.5% by weight of silicon oxide and 0.003% to 1.5% by weight of calcium oxide calculated in terms of SiO$_2$ and CaO, respectively.

6. The electrical resistor element according to claim 1, wherein said electrode means is a pair of electrodes mounted on both sides of the sintered body.

7. An electrical resistor element, comprising a sintered body containing a ferrite ceramic material of a spinel structure represented by the chemical formula Me$_x$Fe$_{3-x}$O$_4$, where Me denotes a metal element, and x is $0 < x < 3$; and electrode means mounted to the sintered body, said sintered body consisting essentially of the main component of Me$_x$Fe$_{3-x}$O$_4$ and containing 0.05% to 10% by volume of an insulator phase containing Bi$_2$O$_3$ and formed at the crystal grain boundary of the ferrite ceramic material.

8. The electrical resistor element according to claim 7, wherein said sintered body contains 0.10% to 10% by volume of said insulator phase.

9. The electrical resistor element according to claim 7, wherein said insulator phase contains a three component system of FeO-SiO$_2$-Al$_2$O$_3$.

10. The electrical resistor element according to claim 7, wherein said insulator phase contains a three component system of FeO-SiO$_2$-CaO.

11. A method of manufacturing an electrical resistor element, comprising a sintered body containing a ferrite ceramic material of a spinel structure represented by the chemical formula Me$_x$Fe$_{3-x}$O$_4$, where Me denotes a metal element, and x is $0 < x < 3$; and electrode means mounted to the sintered body, said method comprising the steps of:

preparing a precursor to the sintered body; and
sintering the precursor under an inert gas atmosphere so as to form 0.05% to 10% by volume of an insulator phase containing Bi$_2$O$_3$ and at the crystal grain boundary of the sintered body.

12. The method of manufacturing an electrical resistor element according to claim 11, wherein said sintered body contains 0.10% to 10% by volume of the insulator phase.

13. The method of manufacturing an electrical resistor element according to claim 11, wherein said insulator phase contains a three component system of FeO-SiO$_2$-Al$_2$O$_3$.

14. The method of manufacturing an electrical resistor element according to claim 11, wherein said insulator phase contains a three component system of FeO-SiO$_2$CaO.

15. The method of manufacturing an electrical resistor element according to claim 12; wherein said sintering step is carried out within a temperature range of between 900° C. and 1300° C.

16. The method of manufacturing an electrical resistor element according to claim 13, wherein said sintering step is carried out within a temperature range of between 1050° C. and 1300° C.

17. The method of manufacturing an electrical resistor element according to claim 14, wherein said sintering step is carried out within a temperature range of between 1050° C, and 1300° C.

* * * * *